US012570029B2

(12) United States Patent
Min et al.

(10) Patent No.: US 12,570,029 B2
(45) Date of Patent: Mar. 10, 2026

(54) METHOD FOR MANUFACTURING POLISHING PAD WINDOW, AND POLISHING PAD WINDOW MANUFACTURED THEREBY

(71) Applicant: KPX CHEMICAL CO., LTD., Seoul (KR)

(72) Inventors: Byung Ju Min, Incheon (KR); Seok Ji Hong, Hwaseong-si (KR); Hak Su Kang, Hwaseong-si (KR); Dae Han Jung, Hwaseong-si (KR); Gi Young Park, Hwaseong-si (KR); Hyun Il Jang, Hwaseong-si (KR)

(73) Assignee: KPX CHEMICAL CO., LTD, Seoul (KR)

( * ) Notice: Subject to any disclaimer, the term of this patent is extended or adjusted under 35 U.S.C. 154(b) by 122 days.

(21) Appl. No.: 18/565,809

(22) PCT Filed: Aug. 24, 2022

(86) PCT No.: PCT/KR2022/012667
§ 371 (c)(1),
(2) Date: Nov. 30, 2023

(87) PCT Pub. No.: WO2023/140450
PCT Pub. Date: Jul. 27, 2023

(65) Prior Publication Data
US 2024/0367356 A1      Nov. 7, 2024

(30) Foreign Application Priority Data

Jan. 20, 2022      (KR) ........................ 10-2022-0008594

(51) Int. Cl.
B29C 45/00          (2006.01)
B24B 37/24          (2012.01)
(Continued)

(52) U.S. Cl.
CPC .......... B29C 45/0001 (2013.01); B24B 37/24 (2013.01); B29C 45/73 (2013.01);
(Continued)

(58) Field of Classification Search
CPC ......... B24B 37/24; B29C 45/00; B29C 45/73; B29K 105/00; B29K 2075/00; B29L 31/00
See application file for complete search history.

(56) References Cited

U.S. PATENT DOCUMENTS 9,314,897 B2      4/2016  Qian et al.
11,207,757 B2      12/2021  Joeng et al.
(Continued)

FOREIGN PATENT DOCUMENTS

CN          100347826 A      11/2007
CN          105014527 A      11/2015
(Continued)

OTHER PUBLICATIONS

JP2020204028A_MT (Year: 2020).*
(Continued)

*Primary Examiner* — Yunju Kim
(74) *Attorney, Agent, or Firm* — Sughrue Mion, PLLC

(57) ABSTRACT

A method for manufacturing a window for a polishing pad is disclosed. The method includes: a) mixing a curing agent with a polyurethane prepolymer having a temperature of 50° C. or higher to less than 100° C. to prepare a mixture; b) injecting the mixture into a mold heated to a temperature of 30° C. or higher to less than 100° C. to a thickness of 5 mm or less; c) demolding a polyurethane cured product from the mold; and d) processing the polyurethane cured product to a thickness of the window of the polishing pad. A polishing pad including the window is also disclosed.

7 Claims, 1 Drawing Sheet

(51) Int. Cl.
    *B29C 45/73*     (2006.01)
    *B29K 75/00*     (2006.01)
    *B29K 105/00*     (2006.01)
    *B29L 31/00*     (2006.01)

(52) U.S. Cl.
    CPC .. *B29K 2075/00* (2013.01); *B29K 2105/0005*
      (2013.01); *B29K 2105/0094* (2013.01); *B29K*
      *2995/0088* (2013.01); *B29K 2995/0097*
      (2013.01); *B29L 2031/736* (2013.01)

(56) References Cited

U.S. PATENT DOCUMENTS

| | | |
|---|---|---|
| 2005/0113008 A1 | 5/2005 | Roberts |
| 2010/0269417 A1 | 10/2010 | Swedek et al. |
| 2014/0357170 A1 | 12/2014 | Qian et al. |
| 2015/0306729 A1 | 10/2015 | Qian et al. |
| 2018/0304439 A1 | 10/2018 | Chiou et al. |
| 2020/0391344 A1 | 12/2020 | Joeng et al. |

FOREIGN PATENT DOCUMENTS

| | | |
|---|---|---|
| CN | 103059551 B | 6/2017 |
| CN | 112094396 A | 12/2020 |
| JP | 11-35652 A | 2/1999 |
| JP | 2000-143763 A | 5/2000 |
| JP | 2005-175464 A | 6/2005 |
| JP | 2012-4335 A | 1/2012 |
| JP | 2013-86217 A | 5/2013 |
| JP | 5240502 B2 | 7/2013 |
| JP | 2020204028 A * | 12/2020 .......... C08G 18/724 |
| JP | 2021-53758 A | 4/2021 |
| KR | 2001-0002696 A | 1/2001 |
| KR | 10-2005-0050582 A | 5/2005 |
| KR | 10-1889081 B1 | 8/2018 |
| KR | 10-2020-0143948 A | 12/2020 |
| TW | 201039981 A1 | 11/2010 |
| WO | 2008/047631 A1 | 4/2008 |
| WO | 2019/031788 A1 | 2/2019 |

OTHER PUBLICATIONS

International Search Report for PCT/KR2022/012667 dated Apr. 24, 2023.
Written Opinion for PCT/KR2022/012667 dated Apr. 24, 2023.
Office Action issued Nov. 20, 2025 in Chinese Patent Application No. 202280039190.0.
Extended European Search Report dated Dec. 23, 2025 from the European Patent Office in Application No. 22922309.4.

* cited by examiner

【Figure 1】
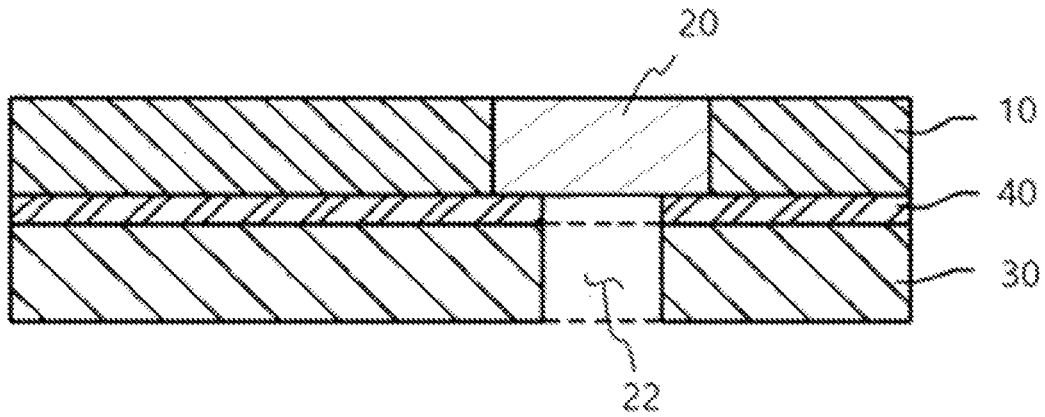
【Figure 2】
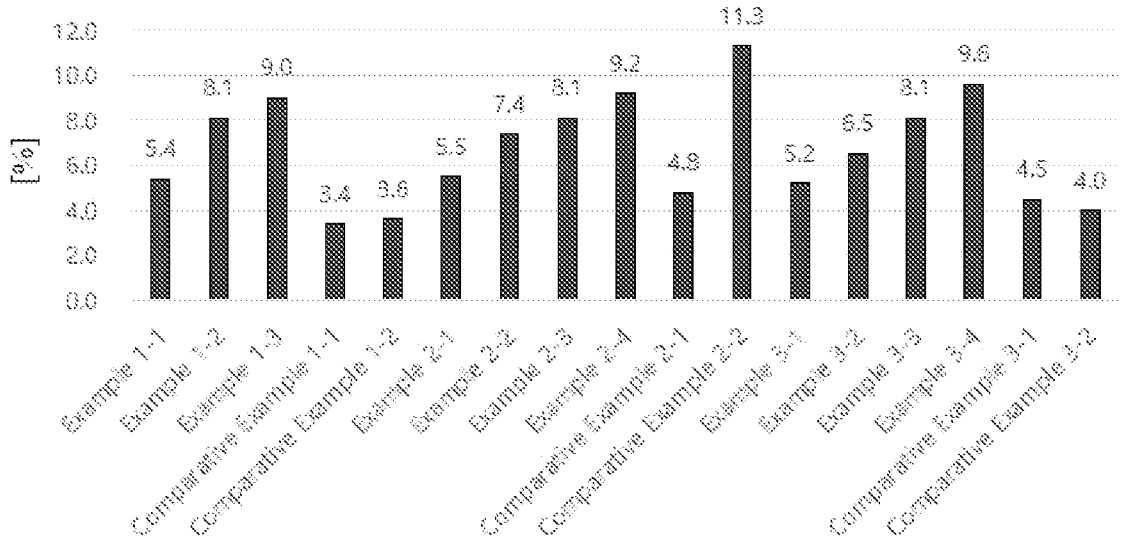

METHOD FOR MANUFACTURING POLISHING PAD WINDOW, AND POLISHING PAD WINDOW MANUFACTURED THEREBY

CROSS REFERENCE TO RELATED APPLICATIONS

This Application is a National Stage of International Application No. PCT/KR2022/012667 filed Aug. 24, 2022, claiming priority based on Korean Patent Application No. 10-2022-0008594 filed Jan. 20, 2022, the entire contents of which are incorporated by reference.

TECHNICAL FIELD

The present invention relates to a method for manufacturing a window for a polishing pad and a window for a polishing pad manufactured by the method.

BACKGROUND ART

A chemical mechanical planarization/polishing (hereinafter referred to as CMP) process is a process introduced for global planarization of semiconductor devices, and is emerging as a more important process in accordance with the trend of a larger diameter of a wafer, higher integration, miniaturization of a line width, and multi-layering of a wiring structure.

In the CMP process, polishing speed and planarization are important and are determined by process conditions of polishing equipment and polishing slurry and a polishing pad that are consumable members. In particular, the polishing pad uniformly disperses the supplied polishing slurry on the wafer while contacting a surface of the wafer, and performs a function of causing a physical removal action by polishing particles inside the polishing slurry and surface protrusions of the polishing pad.

Generally, as illustrated in FIG. 1, the polishing pad includes a polishing layer 10, a window 20 formed on the polishing layer, and a lower support layer 30, and the lower support layer 30 has an opening 22 formed under the window. The polishing layer and the lower support layer are bonded by an adhesive layer 40.

The window is formed to detect a polishing end point of the wafer in the CMP process, and the detection is performed by transmitting an optical beam such as a laser beam through the window. Therefore, the window should have a transmittance in a specific area through which the optical beam may pass.

However, the conventional window does not have sufficient transmittance for the passage of the optical beam, and therefore, have the disadvantage of making it difficult to accurately and reliably detect the polishing end point of the wafer in the CMP process.

Therefore, there is a need for the development of a window with improved transmittance.

PRIOR ART DOCUMENT

Patent Document

Korean Patent Laid-open Publication No. 10-2001-2696

DISCLOSURE

Technical Problem

The present invention provides a method for manufacturing a window for a polishing pad capable of efficiently manufacturing a window with excellent transmittance.

In addition, the present invention provides a window for a polishing pad capable of accurately and reliably detecting a polishing end point of a wafer through excellent transmittance, and a polishing pad including the same.

Technical Solution

To achieve the object, the present invention provides a method for manufacturing a window for a polishing pad, includes:
  a) mixing a curing agent with a polyurethane prepolymer having a temperature of 50° C. or higher to less than 100° C. to prepare a mixture;
  b) injecting the mixture into a mold heated to a temperature of 30° C. or higher to less than 100° C. to a thickness of 5 mm or less;
  c) demolding a polyurethane cured product from the mold; and
  d) processing the polyurethane cured product to a thickness of the window of the polishing pad.
  In addition, the present invention
  provides a window for a polishing pad manufactured by the method and having a transmittance of 5% or more based on a thickness of 1.9 mm.
  In addition, the present invention
  provides a polishing pad including the window.

Advantageous Effects

A method for manufacturing a window for a polishing pad of the present invention provides a method capable of efficiently manufacturing a window with excellent transmittance.

In addition, the window for a polishing pad and the polishing pad including the same of the present invention make it possible to accurately and reliably detect a polishing end point of a wafer through improved transmittance.

DESCRIPTION OF DRAWINGS

FIG. 1 is a cross-sectional view schematically illustrating the form of a general polishing pad including a window, and FIG. 2 is a graph showing transmittance measurement results of a window for a polishing pad of the present invention.

BEST MODE

Hereinafter, embodiments of the present invention will be described in detail with reference to the accompanying drawings so that those skilled in the art may easily practice the present invention. However, the present invention may be implemented in various different forms, and is not limited to embodiments described herein. Throughout the present disclosure, similar components will be denoted by like reference numerals.

In the present invention, the meaning of "~including" means that other components may further be included in addition to any included components, but it also refers to a case where it is composed of only one of the above components without any other components.

A method for manufacturing a window for a polishing pad according to the present invention includes:

a) mixing a curing agent with a polyurethane prepolymer having a temperature of 50° C. or higher to less than 100° C. to prepare a mixture;

b) injecting the mixture into a mold heated to a temperature of 30° C. or higher to less than 100° C. to a thickness of 5 mm or less;

c) demolding a polyurethane cured product from the mold; and d) processing the polyurethane cured product to a thickness of the window of the polishing pad.

The present inventors completed the present invention by discovering that in the case of windows made of a polyurethane material, a transmittance varies depending on heat generation control during curing and a manufacturing method.

In other words, the present inventors completed the present invention by discovering that when manufacturing a window made of a polyurethane material, a temperature of the polyurethane prepolymer and a temperature of a mold affect a transmittance of the window, and a thickness of a cake-shaped polyurethane cured product also affects the transmittance of the window.

When the temperature of the polyurethane prepolymer in step a) above is 50° C. or higher to less than 100° C., the transmittance of the window is greatly improved. However, when the temperature is less than 50° C. or 100° C. or higher, the transmittance of the window significantly decreases.

It appears that the reason why the transmittance decreases depending on the temperature of polyurethane prepolymer is because when the temperature increases, a degree of crystallinity of an internal structure of urethane increases.

In an embodiment of the present invention, the temperature of the polyurethane prepolymer may be preferably 50° C. to 90° C., and more preferably 50° C. to 70° C.

In step a) above, the polyurethane prepolymer with a weight average molecular weight of 500 to 3000, and more preferably, 800 to 2500 may be used.

The polyurethane prepolymer may be prepared by a polymerization of compositions including at least one isocyanate compound selected from the group consisting of toluene diisocyanate, 4,4'-diphenylmethane diisocyanate, naphthalene-1,5-diisocyanate, toluidine diisocyanate, paraphenylene diisocyanate, xylene diisocyanate, isophorone diisocyanate, hexamethylene diisocyanate, 4,4'-dicyclohexylmethane diisocyanate, and cyclohexane diisocyanate; and one or more polyol compound components selected from the group consisting of polyether polyol (e.g., poly(oxytetramethylene) glycol, poly(oxypropylene) glycol, poly(oxyethylene) glycol), polycarbonate polyol, polyester polyol, polycaprolactone polyol, etc.

As the isocyanate compound above, those selected from toluene diisocyanate (TDI), 4,4'-diphenyl methane diisocyanate, dicyclohexylmethane diisocyanate, etc., may be more preferably used, and as the polyol compound, those selected from polycaprolactone polyol, polytetramethylene ether glycol (PTMEG), polypropylene ether glycol (PPG), polyethylene ether glycol (PEG), etc., may be more preferably used.

The polymerization composition may further include at least one chain extenders selected from the group consisting of ethylene glycol (EG), 1,2-propylene glycol, 1,3-propylene glycol, 1,2-butanediol, 1,3-butanediol, 2-methyl-1,3-propanediol, 1,4-butanediol (BDO), neopentyl glycol, 1,5- pentanediol, 3-methyl-1,5-pentanediol, 1,6-hexanediol, diethylene glycol, dipropylene glycol, tripropylene glycol, etc.

In step a) above, as the curing agent, at least one selected from the group consisting of 4,4'-methylene-bis-(2-chloroaniline) (MBOCA), diethyltoluenediamine (DETDA), 3,5-dimethylthio-2,4-toluenediamine and isomers thereof (e.g., 3,5-diethyltoluene-2,6-diamine); 3,5-diethyltoluene-2,4-diamine and isomers thereof; 4,4'-bis-(sec-butylamino)-diphenylmethane; 1,4-bis-(sec-butylamino)-benzene; 4,4'-methylene-bis-(2-chloroaniline); 4,4'-methylene-bis-(3-chloro-2, 6-diethylaniline) (MCDEA); polytetramethyleneoxide-di-p-aminobenzoate; N,N'-dialkyldiamino diphenyl methane; p,p'-methylene dianiline (MDA); m-phenylenediamine (MPDA); 4,4'-methylene-bis-(2,6-diethylaniline) (MDEA); 4,4'-methylene-bis-(2,3-dichloroaniline) (MDCA); 4,4'-diamino-3,3'-diethyl-5,5'-dimethyl diphenylmethane; 2,2',3, 3'-tetrachloro diamino diphenylmethane; and trimethylene glycol di-p-aminobenzoate, etc., may be used.

In step a) above, the polyurethane prepolymer and the curing agent may be mixed in a weight ratio of 9:1 to 7:3 based on a dry weight.

In step b) above, the mold heated to a temperature of 30° C. or higher to less than 100° C. is used. When the temperature of the mold is less than 30° C., the transmittance may be improved, but since the polyurethane is not hardened, it is difficult to apply to the present invention. In addition, when the temperature of the mold is 100° C. or higher, the transmittance of the window significantly decreases, which is not preferable.

As described above, it is believed that the reason why the transmittance decreases when the temperature of the mold is 100° C. or higher is because when the temperature of the mold increases, the degree of crystallinity of the internal structure of urethane increases.

In an embodiment of the present invention, the temperature of the mold may be preferably 30° C. to 80° C., more preferably 30° C. to 70° C., even more preferably 30° C. to 60° C., and particularly preferably 30° C. to 50° C.

In step b) above, the injection of the mixture of the polyurethane prepolymer and the curing agent into the mold may be made to a thickness of 5 mm or less. When the injection thickness exceeds 5 mm, the transmittance of the window significantly decreases.

As described above, it is believed that the reason why the transmittance decreases according to the injection thickness is because when the injection thickness becomes thicker, heat energy is accumulated during an exothermic reaction with the curing agent, the internal temperature increases, and the degree of crystallinity increases.

In an embodiment of the present invention, the injection thickness may preferably be 2 mm to 5 mm, more preferably 2 mm to 4 mm, and even more preferably 2 mm to 3 mm.

When the mixture is injected to the thickness described above, the thickness of the polyurethane cured product (cake) is also determined depending on the injection thickness.

In an embodiment of the present invention, it is particularly preferable that the temperature of the polyurethane prepolymer in step a) above is 50° C. to 70° C., the temperature of the mold in step b) above is 30° C. to 60° C., and the injection of the mixture of the polyurethane prepolymer and the curing agent in step b) above into the mold is made to a thickness of 2 mm to 3 mm.

The window for a polishing pad of the present invention is manufactured by the manufacturing method of the present invention, and has a transmittance of 5% or more, preferably 7% or more, and more preferably 8% or more based on a thickness of 1.9 mm.

Hereinafter, the present invention will be described in detail with reference to the Examples. However, the embodiments according to the present invention may be modified into various other forms, and the scope of the present invention should not be construed as being limited to the embodiments described in detail below. Examples of the present invention are provided to more completely explain the present invention to those with average knowledge in the art.

Example 1-1: Manufacturing of Window for Polishing Pad

80% by weight of polyurethane prepolymer (PT411 from KPX company, NCO %: 9.2, viscosity: 24000 cPs, weight average molecular weight: 1850) heated to 90° C. and 20% by weight of curing agent (MOCA, 4,4'-methylenebis(2-chloroaniline)) were mixed. The mixture was injected into a mold heated to 50° C. and first hardened for 1 hour, and then post-cured in an oven for 16 hours to prepare a Cake (polyurethane cured product) with a thickness of 3 mm. Next, the Cake was processed to a thickness of 1.9 mm to manufacture a window.

Example 1-2: Manufacturing of Window for Polishing Pad

A window with a thickness of 1.9 mm was manufactured in the same method as in Example 1-1, except that the polyurethane prepolymer having a temperature of 70° C. in Example 1-1 was used.

Example 1-3: Manufacturing of Window for Polishing Pad

A window with a thickness of 1.9 mm was manufactured in the same method as in Example 1-1, except that the polyurethane prepolymer having a temperature of 50° C. in Example 1-1 was used.

Example 2-1: Manufacturing of Window for Polishing Pad

A window with a thickness of 1.9 mm was manufactured in the same method as in Example 1-1, except that the polyurethane prepolymer heated to 70° C. in Example 1-1 was used and the mold heated to 80° C. was used.

Example 2-2: Manufacturing of Window for Polishing Pad

A window with a thickness of 1.9 mm was manufactured in the same method as in Example 2-1, except that the mold heated to 60° C. in Example 2-1 was used.

Example 2-3: Manufacturing of Window for Polishing Pad

A window with a thickness of 1.9 mm was manufactured in the same method as in Example 2-1, except that the mold heated to 50° C. in Example 2-1 was used.

Example 2-4: Manufacturing of Window for Polishing Pad

A window with a thickness of 1.9 mm was manufactured in the same method as in Example 2-1, except that the mold heated to 30° C. in Example 2-1 was used.

Example 3-1: Manufacturing of Window for Polishing Pad

A window with a thickness of 1.9 mm was manufactured in the same method as in Example 1-1, except that the polyurethane prepolymer heated to 70° C. in Example 1-1 was used and the thickness of the Cake was adjusted to 5 mm.

Example 3-2: Manufacturing of Window for Polishing Pad

A window with a thickness of 1.9 mm was manufactured in the same method as in Example 3-1, except that the thickness of the Cake in Example 3-1 was adjusted to 4 mm.

Example 3-3: Manufacturing of Window for Polishing Pad

A window with a thickness of 1.9 mm was manufactured in the same method as in Example 3-1, except that the thickness of the Cake in Example 3-1 was adjusted to 3 mm.

Example 3-4: Manufacturing of Window for Polishing Pad

A window with a thickness of 1.9 mm was manufactured in the same method as in Example 3-1, except that the thickness of the Cake in Example 3-1 was adjusted to 2 mm.

Comparative Example 1-1: Manufacturing of Window for Polishing Pad

A window with a thickness of 1.9 mm was manufactured in the same method as in Example 1-1, except that the polyurethane prepolymer heated to 100° C. in Example 1-1 was used.

Comparative Example 1-2: Manufacturing of Window for Polishing Pad

A window with a thickness of 1.9 mm was manufactured in the same method as in Example 1-1, except that the polyurethane prepolymer heated to 40° C. in Example 1-1 was used.

Comparative Example 2-1: Manufacturing of Window for Polishing Pad

A window with a thickness of 1.9 mm was manufactured in the same method as in Example 1-1, except that the polyurethane prepolymer heated to a temperature of 70° C. in Example 1-1 was used and the mold heated to 100° C. was used.

Comparative Example 2-2: Manufacturing of Window for Polishing Pad

A window with a thickness of 1.9 mm was manufactured in the same method as in Comparative Example 2-1, except that the mold heated to 20° C. in Comparative Example 2-1 was used.

Comparative Example 3-1: Manufacturing of
Window for Polishing Pad

A window with a thickness of 1.9 mm was manufactured
in the same method as in Example 1-1, except that the
polyurethane prepolymer heated to 70° C. in Example 1-1
was used and the thickness of the Cake was adjusted to 6
mm.

Comparative Example 3-2: Manufacturing of
Window for Polishing Pad

A window with a thickness of 1.9 mm was manufactured
in the same method as in Comparative Example 3-1, except
that the thickness of the Cake in Comparative Example 3-1
was adjusted to 8 mm.

Test Example 1: Transmittance Measurement

After conditioning the 1.9 mm thick window manufac-
tured in the above Examples and Comparative Examples
with a diamond disk (LPX2 product from Saesol company)
for 15 minutes, the transmittance was measured at 670 nm
light using a transmittance analysis device (UV-Visible
Spectrometer Lambda-365 from Perkin Elmer company),
and the results are shown in Table 1 below.

TABLE 1

| Division | Prepolymer temperature ° C. | Mold temperature ° C. | Cake thickness mm | Transmittance % |
|---|---|---|---|---|
| Example 1-1 | 90 | 50 | 3 | 5.4 |
| Example 1-2 | 70 | 50 | 3 | 8.1 |
| Example 1-3 | 50 | 50 | 3 | 9.0 |
| Comparative Example 1-1 | 100 | 50 | 3 | 3.4 |
| Comparative Example 1-2 | 40 | 50 | 3 | 3.6 |
| Example 2-1 | 70 | 80 | 3 | 5.5 |
| Example 2-2 | 70 | 60 | 3 | 7.4 |
| Example 2-3 | 70 | 50 | 3 | 8.1 |
| Example 2-4 | 70 | 30 | 3 | 9.2 |
| Comparative Example 2-1 | 70 | 100 | 3 | 4.8 |
| Comparative Example 2-2 | 70 | 20 | 3 | 11.3 |
| Example 3-1 | 70 | 50 | 5 | 5.2 |
| Example 3-2 | 70 | 50 | 4 | 6.5 |
| Example 3-3 | 70 | 50 | 3 | 8.1 |
| Example 3-4 | 70 | 50 | 2 | 9.8 |
| Comparative Example 3-1 | 70 | 50 | 6 | 4.5 |
| Comparative Example 3-2 | 70 | 50 | 8 | 4.0 |

In the case of Comparative Example 2-2 above, the
transmittance is improved depending on the temperature of
the mold, but since the polyurethane is not cured, it is
difficult to apply to the manufacturing of the window.

The invention claimed is:

1. A method for manufacturing a window for a polishing
pad, comprising:
   a) mixing a curing agent with a polyurethane prepolymer
      having a temperature of 50° C. to 70° C. to prepare a
      mixture;
   b) injecting the mixture into a mold heated to a tempera-
      ture of 30° C. to 60° C. to a thickness of 2 mm to 4 mm;
   c) demolding a polyurethane cured product from the
      mold; and
   d) processing the polyurethane cured product to a thick-
      ness of the window of the polishing pad.

2. The method according to claim 1, wherein the injection
of the mixture in step b) into the mold is made to a thickness
of 2 mm to 3 mm.

3. The method according to claim 1, wherein the poly-
urethane prepolymer has a weight average molecular weight
of 500 to 3000.

4. The method according to claim 3, wherein the poly-
urethane prepolymer is prepared by a polymerization of a
composition comprising one or more isocyanate compounds
selected from the group consisting of toluene diisocyanate,
4,4'-diphenylmethane diisocyanate, naphthalene-1,5-diiso-
cyanate, toluidine diisocyanate, paraphenylene diisocyanate,
xylene diisocyanate, isophorone diisocyanate, hexamethyl-
ene diisocyanate, 4,4'-dicyclohexylmethane diisocyanate,
and cyclohexane diisocyanate; and one or more polyol
compounds selected from the group consisting of polyether
polyol, polycarbonate polyol, polyester polyol, and poly-
caprolactone polyol.

5. The method according to claim 4, wherein the compo-
sition further comprises one or more chain extenders
selected from the group consisting of ethylene glycol (EG),
1,2-propylene glycol, 1,3-propylene glycol, 1,2-butanediol,
1,3-butanediol, 2-methyl-1,3-propanediol, 1,4-butanediol
(BDO), neopentyl glycol, 1,5-pentanediol, 3-methyl-1,5-
pentanediol, 1,6-hexanediol, diethylene glycol, dipropylene
glycol, and tripropylene glycol.

6. The method according to claim 1, wherein the curing
agent comprises one or more selected from the group
consisting of 4,4'-methylene-bis-(2-chloroaniline)
(MBOCA), diethyltoluenediamine (DETDA), 3,5-dimethyl-
thio-2,4-toluenediamine and isomers thereof; 3,5-diethyl-
toluene-2,4-diamine and isomers thereof; 4,4'-bis-(sec-buty-
lamino)-diphenylmethane; 1,4-bis-(sec-butylamino)-
benzene; 4,4'-methylene-bis-(2-chloroaniline); 4,4'-
methylene-bis-(3-chloro-2,6-diethylaniline) (MCDEA);
polytetramethyleneoxide-di-p-aminobenzoate; N,N'-dial-
kyldiamino diphenyl methane; p,p'-methylene dianiline
(MDA); m-phenylenediamine (MPDA); 4,4'-methylene-bis-
(2,6-diethylaniline) (MDEA); 4,4'-methylene-bis-(2,3-di-
chloroaniline) (MDCA); 4,4'-diamino-3,3'-diethyl-5,5'-dim-
ethyl diphenylmethane; 2,2',3,3'-tetrachloro diamino
diphenylmethane; and trimethylene glycol di-p-aminoben-
zoate.

7. The method according to claim 1, wherein the poly-
urethane prepolymer and the curing agent are mixed in a
weight ratio of 9:1 to 7:3 based on a dry weight.

* * * * *